Feb. 13, 1951 H. W. LORD 2,541,824

ELECTRONIC INTEGRATING CIRCUIT

Filed Dec. 30,

Inventor:
Harold W. Lord,
by Paul A. Frank
His Attorney.

Patented Feb. 13, 1951 2,541,824

UNITED STATES PATENT OFFICE 2,541,824

ELECTRONIC INTEGRATING CIRCUIT

Harold W. Lord, Schenectady, N. Y., assignor to General Electric Company, a corporation of New York Application December 30, 1949, Serial No. 135,897

3 Claims. (Cl. 171—95)

Figure 1:
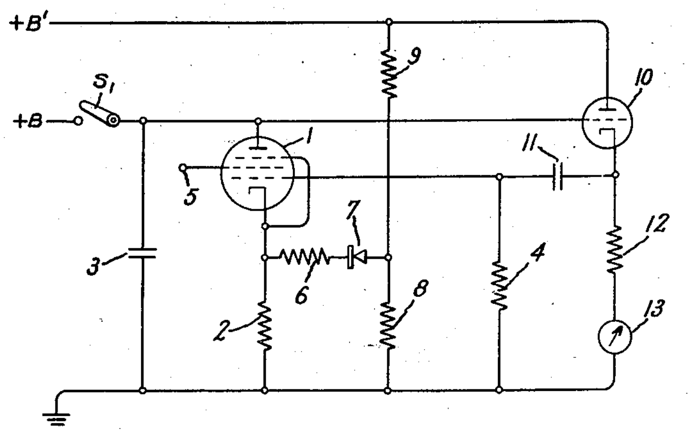

My invention relates to electronic circuits and, more particularly, to electronic circuits for integrating voltage functions applied to their input terminals.

Electronic valve apparatus or electronic discharge devices have found relatively wide application in those systems where it is desired to integrate a rapidly varying function. In accordance with the teachings of my invention described hereinafter, I provide a new and improved electronic integrating circuit wherein greater precision and accuracy of operation over a wide range of input voltages are obtained than that afforded by the prior art type of integrators.

It is, therefore, an object of my invention to provide an improved electric circuit wherein the output is proportional to the integral with respect to time of the input.

It is another object of my invention to provide an improved electronic integrating circuit operating throughout a wide range of magnitudes of input voltages.

It is a further object of my invention to provide an electronic integrating circuit which will integrate an input function throughout long periods of time.

Briefly stated, in the illustrated embodiment of my invention, I provide an improved electronic valve type integrating circuit whereby the current in a device produces an indication of the integral of a voltage applied to the screen grid of an electronic valve. There is a capacitor in this circuit so connected that it may be discharged by means of an electronic valve whose anode current is proportional to its screen grid voltage but is independent of plate voltage. The rate of discharge of this capacitor is thus proportional to the voltage applied to the screen grid of the electronic valve, which in the art is known as a constant current electronic valve. If the capacitor is initially charged, the voltage across it at any later instant is dependent upon the magnitude of the average voltage applied to the screen grid of the electronic valve and to the time during which this voltage is applied. In the illustrated circuit, I employ a cathode follower type of vacuum tube voltmeter to indicate the magnitude of voltage on the capacitor. To afford a wide range of magnitudes of input voltages over which the capacitor discharges at a rate proportional to the screen grid voltage, I employ a means whereby as the screen voltage becomes small, the voltage on the control grid is proportionately reduced. I accomplish this by supplying a low voltage to drive current through a unilateral device in such a direction as to affect the previously mentioned voltage on the control grid. For any one screen grid voltage within the operating range of this circuit, the electronic valve draws constant current and, consequently, the capacitor continues to discharge linearly with respect to time as the voltage across it decreases. Thus, as the voltage applied to the screen grid is decreased, the voltage on the control grid is automatically adjusted and linearity is achieved. To further improve the linearity of the capacitor discharge rate, and to provide long integrating periods throughout which this device will function proportional, a signal which is dependent upon the rate of discharge of the capacitor is fed back to the control grid of the electronic valve.

Figure 2:
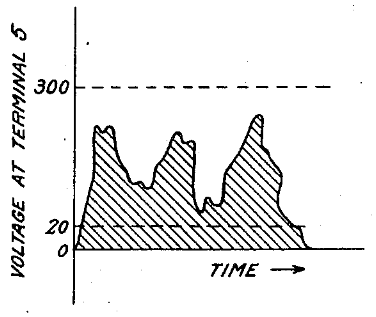

For a better understanding of my invention, reference may be had to the following description taken in connection with the accompanying drawing, and its scope will be pointed out in the appended claims. Fig. 1 of the accompanying drawing is a schematic electric circuit diagram of my invention. Fig. 2 illustrates a curve of an input voltage which might be applied to the circuit of Fig. 1.

Referring to Fig. 1, there is shown a schematic electric circuit diagram of my integrating device in which a constant current electronic valve 1, preferably of type 6SH7, has its plate connected through a switch $S_1$ to a first source of direct potential. A cathode dropping resistor 2 is interconnected between the cathode of valve 1 and ground. A capacitor 3 is connected between the plate of valve 1 and ground, and a resistor 4 is connected between the control grid of valve 1 and ground. The screen grid of valve 1 is electrically tied to the cathode, and the screen grid is connected to a terminal 5. A resistor 6, a unilateral impedance device 7, such, for example, as a crystal rectifier or a diode, and a resistor 8 are serially connected between the cathode of valve 1 and ground, and a resistor 9 is connected between the junction of unilateral device 7 and resistor 8 to a second source of positive potential. An electronic valve 10 which is shown for convenience as a triode but which may be one of many other types of electronic valves having an anode, a cathode and a control electrode, has its plate connected to the second direct voltage supply, its control electrode connected to the plate of valve 1 and its cathode connected through a capacitor 11 to the control grid of valve 1. A resistor 12 and an indicating device 13 having a pointer which deflects in proportion to the current in device 13, are serially connected between the cathode of triode 10 and ground.

In operation, switch $S_1$ is first closed to charge capacitor 3. It should be understood that any means for initially charging capacitor 3 will suffice and the means shown is only by means of illustration. A blocking oscillator circuit or a thyratron are two examples of the many types of circuits which may be used to initially charge the capacitor. If switch $S_1$ having been closed is reopened, the potential at the plate of valve 1 is equal to the voltage across capacitor 3. The current in a pentode is directly proportional to the direct potential on its screen grid and, therefore, the rate at which capacitor 3 discharges is directly proportional to the voltage on terminal 5. Consequently, the voltage across capacitor 3 at any time after $S_1$ has been reopened is proportional to the product of the average voltage which has been applied at terminal 5, and the time during which this average voltage was applied.

The cathode follower type of indicator has been chosen to indicate the voltage across capacitor 3 because it does not draw grid current and hence does not discharge capacitor 3 and disrupt the operation of the system. It should be understood, however, that this circuit is not limited to the type of indicator shown but that any high input impedance voltmeter which will not discharge capacitor 3 may be used. The current through tube 10 is dependent upon the voltage applied to its control grid, and because current indicating device 13 is in the plate circuit of tube 10, its indication of current is dependent upon the voltage across capacitor 3.

Although a pentode has an anode-to-cathode current proportional to the screen grid voltage throughout a given range, this range is somewhat limited and an addition to this circuit is necessary to increase this range. A voltage divider comprising resistors 8 and 9 is connected from the second direct voltage supply and ground, and from the junction of these resistors, unilateral device 7 and resistor 6 are so connected that positive ion current may pass through cathode resistor 2 away from the cathode of valve 1 such as to increase the potential on the cathode. Because of the unidirectional action of device 7, when the cathode potential of valve 1 becomes greater than the potential across resistor 8, current does not flow through resistor 8 from valve 1. As the potential applied to the screen grid of valve 1 is decreased such that the voltage drop across resistor 2 would normally be very small and a large control grid-to-cathode voltage on valve 1 would be affected, current is fed through device 7 and through resistor 2 to increase the cathode potential of valve 1. Consequently, the control grid-to-cathode voltage of valve 1 is reduced and the anode-to-cathode current varies more linearly with respect to screen voltage. The differentiating circuit comprising capacitor 11 and resistor 4 feeds back a positive voltage which is the differential of the current in device 13. With this integrating circuit it is possible to obtain an accuracy of ±2% within a practical operating range of +20 to +300 volts, and with such a switch as the blocking oscillator type this circuit may be used for the integrating of pulses having a high repetition frequency and a short duration of pulse time.

Referring to Fig. 2 there is shown a curve in which the envelope is the input voltage to terminal 5 with respect to time, and the area beneath this curve, which is cross-hatched, is proportional to the deflection of the pointer of indicator B.

While it will be understood that the circuit specifications of the electronic integrating circuit shown in Fig. 1 may vary according to the design for any particular application, the following circuit specifications have been found to be satisfactory for an integrator having a range of magnitude of input voltages from +20 to +300 volts and having an accuracy of ±2%.

Valve 1—6SH7
Valve 10—6J5
Resistor 2—1000 ohms
Resistor 4—1 megohm
Resistor 6—3500 ohms
Resistor 8—500 ohms
Resistor 9—50,000 ohms
Resistor 12—20,000 ohms
Capacitor 3—Depends upon required operation range
Capacitor 11—Depends upon required operation range.

Capacitor 3 and capacitor 11 have been found to be approximately equal.

While I have shown a particular circuit designed to operate in accordance with my invention, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. An electronic integrating circuit comprising a constant current type electronic valve having an anode, a cathode, a control electrode, a suppressor electrode, and a screen electrode, a first resistor, said resistor being interconnected between said cathode and ground, a first capacitor, said capacitor being interconnected between said anode and ground, a second resistor, said second resistor being interconnected between said control electrode and ground, a second capacitor, a third resistor, a current indicating device, said second capacitor, said third resistor and said device being serially connected between the control electrode of said valve and ground, a second electronic valve having a cathode, an anode and a control electrode, a first source of direct potential, a pair of resistors, said pair of resistors being serially connected between said potential source and ground, a unilateral impedance device, a fourth resistor, said impedance device and said fourth resistor being serially connected between the junction of said pairs of resistors and the cathode of said first valve, a second source of direct potential, and a means for switching said second source across said first capacitor, whereby an indication on said indicating device is proportional to the integral with respect to time of a voltage function applied to the screen grid of said first device.

2. An electronic integrating circuit comprising a constant current electronic valve, a first source of direct positive potential, a first capacitor, a means for switching said source of potential to and from said capacitor, said capacitor being connected between said switching means and a point of potential lower than said source of potential, an anode of said valve being electrically connected to the high potential side of said capacitor, a first resistor, a cathode of said valve being connected to the low potential side of said capacitor through said resistor, a second resistor, a third resistor, a unidirectional impedance device, said second resistor, said unidirectional device, and said third resistor serially connected across said first resistor, a second source of direct positive potential, a resistor interconnected between said second source of potential and the junction of said unidirectional device and said third resistor, a resistor interconnected between a control electrode of said valve and the low potential side of said first capacitor, an electronic discharge device, an anode of said device being connected to said second source of potential, a control electrode of said discharge device being connected to the anode of said valve, a second capacitor, a cathode of said discharge device being connected through said second capacitor to the control electrode of said valve, a fifth resistor, and a current indicating device, said fifth resistor and said current indicating device being serially connected between the cathode of said discharge device and the low potential side of said first capacitor, to produce an indication on said indicating device which is proportional to the product of the average voltage applied to a suppressor electrode of said valve and the time during which this average voltage is applied.

3. An integrating apparatus comprising a first capacitor initially charged to a predetermined direct potential, an electronic valve being provided with a cathode, a control electrode, a screen electrode, a suppressor electrode, and an anode, arranged to discharge said first capacitor at a rate which is substantially a linear function of a voltage impressed upon said screen electrode, and relatively independent of the voltage across said first capacitor, means including a unidirectional device and a source of direct potential for increasing the range of screen voltages over which the discharge rate of said first capacitor is a linear function of the voltage of said screen electrode, a linearity improving feedback circuit including a second capacitor and a first resistor arranged to impress a voltage proportional to the rate of change of the voltage on said first capacitor upon said control electrode, and a means which draws a negligible amount of current from said first capacitor for indicating the voltage across said first capacitor.

HAROLD W. LORD.

No references cited.